United States Patent Office 2,921,939
Patented Jan. 19, 1960

2,921,939

PROCESS FOR PREPARING α-SUBSTITUTED ACETIC ACIDS

Hugh E. Ramsden, Metuchen, N.J., assignor to Metal & Thermit Corporation, New York, N.Y., a corporation of New Jersey No Drawing. Application November 28, 1955
Serial No. 549,544

6 Claims. (Cl. 260—295)

This invention relates to a process of reacting organomagnesium chloride reagents with alpha haloacid derivatives and products made by this process. This application is a continuation-in-part of application Serial Number 520,144, filed July 5, 1955, now abandoned.

The organomagnesium chloride reagents employed in practicing this invention may be described as $$RMgCl \cdot nQ$$

where R is an aryl group, a vinyl group or a heterocyclic group as more particularly defined below, $n$ is an indeterminate number from 1 to 3 and Q has a value hereinafter defined. These organomagnesium chloride reagents are made by reacting the corresponding RCl with magnesium in the presence of compound Q as reaction medium. In accordance with this invention, these organomagnesium chloride reagents react with alpha haloacid derivatives to yield useful products.

Compound Q is a substituted or unsubstituted heterocyclic compound (having 5 or 6 atoms in the ring) containing one oxygen atom in the ring structure; the other ring atoms being carbon with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran, 2-methyltetrahydrofuran, 2-ethoxytetrahydropyran, tetrahydrofurfuryl ethyl ether, dihydropyran, dibenzofuran and N-methylmorpholine. Permissible substitutions being groups which are not reactive with organomagnesium chlorides, or with any of the other components and products of the reaction mixtures of the present process, and includes substituted and unsubstituted alkyl, aryl, alkoxy and aryloxy groups (all allowable substitutes being those unreactive to other components of the reaction mixture as specified hereinbefore). Where nitrogen replaces a carbon atom, hydrogen on the nitrogen atom must be substituted with a group unreactive to the reactants or reaction products. A further requirement for Q is that the oxygen must be available for electron donation, i.e., the free p-electrons present on the oxygen should be available for coordination with the organomagnesium chloride. Any large blocking groups in the 2 and 5 (6) position may restrict the availability of these electrons. Another way these electrons may be restricted in their availability is by p-pi resonance, as for example in furan, which is not operative. One double bond giving p-pi resonance, as in dihydropyran (which is operative) allows reactivity since the oxygen still has free p-electrons. Expressed in another fashion, the oxygen of the heterocyclic ring structure must be such that electrons of the oxygen atom are available for coordination and complex formation with magnesium. Since Q also apparently functions as a solvent, a Q which has a high melting point may still function in this invention, but if it is used as solvent, obviously the high melting point (e.g., above 90° C.) causes great difficulty in carrying out the reaction. Any liquid Q of any structure whatsoever (with the limitations specified hereinbefore) will work.

The compound Q, employed to promote reaction and to form a complex with the vinyl, heterocyclic or aryl magnesium chloride may be a simple 5 or 6 member heterocyclic compound containing one oxygen in the ring and having the requisite characteristics set forth above, e.g., tetrahydrofuran, tetrahydropyran, dihydropyran, etc. It may also be a 5 or 6 member heterocyclic compound containing one oxygen in the ring and further substituted by monovalent groups and having said characteristics, e.g., 2-methyltetrahydrofuran, 2-ethoxytetrahydrofuran, tetrahydrofurfuryl ethyl ether, N-methyl morpholine, etc. Furthermore, the compound Q may be a 5 or 6 member heterocyclic compound having one oxygen atom in the ring and substituted by polyvalent radicals to form fused ring compounds, providing that the compound has the necessary characteristics set forth above in the definition of compound Q, e.g., dibenzofuran, etc.

It is an object of the present invention to provide a process for reacting said organomagnesium chlorides with alpha haloacid derivatives to yield useful products. It is also an object of this invention to provide several new products useful in industry.

The reactions are carried out in the compound Q as reaction medium, preferably at a temperature between room temperature and the reflux temperature. Inert hydrocarbon solvent may be used as the reaction medium. However, the temperature is not particularly critical and may be even lower than room temperature.

The α-halo acid derivative which is caused to react with the organomagnesium reagent is preferably an ester or a salt. While the acid itself may be used, this is not usually desirable because reaction between the acid hydrogen and the magnesium reagent destroys a large part of the latter, forming unwanted by-products. When it is desired to produce aryl-, vinyl- or heterocycle-substituted carboxylic acids, it is best to make first the corresponding substituted ester or salt, employing the process of this invention, and then to convert the ester or salt to the acid by well-known hydrolytic methods.

The reaction involved in the process of this invention may be illustrated by the general equation:

(1) $RMgCl \cdot nQ + R'R''XCCO_2R''' \rightarrow RR'R''CCO_2R'''$ where $RMgCl \cdot nQ$ is the organomagnesium chloride reagent previously defined, R' and R'' are the same or different and may be hydrogen or organic radicals, X is halogen and R''' is an organic group or a metal. Usually the metal will be an alkali metal but almost any metal will work. It will be evident that when the metal has a valence other than 1, the formula must be modified to correspond.

ARYLMAGNESIUM CHLORIDE REAGENTS

The reactions of arylmagnesium chloride reagents with alpha halo acid derivatives in accordance with this invention may be illustrated by the following over-all equations:

(2) $RMgCl \cdot nQ + R'R''(X)C$
$—CO_2R''' \rightarrow RR'R''C—CO_2R''' + nQ$ Specifically:

(3) $RMgCl \cdot nQ + XCH_2CO_2R''' \rightarrow RCH_2CO_2R''' + nQ$

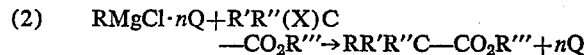

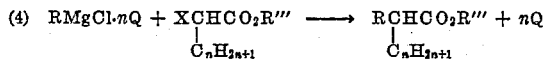

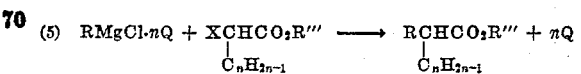

(6) RMgCl·nQ + XCHCO₂R''' ⟶ RCHCO₂R''' + nQ
         |                    |
         R'                   R'

(7) 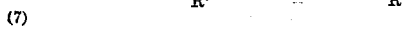 MgCl·nQ + XCH₂CO₂C₂H₅ ⟶

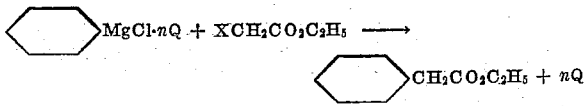 CH₂CO₂C₂H₅ + nQ wherein n is a small whole number, R' and R" may be alkyl, aryl, alkenyl, aralkyl and hydrogen, R''' is an organic group or a metal, and wherein R is defined as:

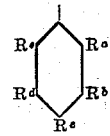

wherein $R^a$, $R^b$, $R^c$, $R^d$ and $R^e$ may be the same or different substituents as long as they do not react with the arylmagnesium chloride reagent. They may be hydrogen; fluorine, chlorine; alkyl, such as methyl, ethyl, etc.; alkenyl, such as vinyl, allyl, propenyl, etc.; aryl, such as phenyl, tolyl, xylyl, xenyl, etc.; aralkyl, such as benzyl, phenylethyl, cinnamyl, methylbenzyl, etc.; heterocyclic, such as thienyl, thenyl, furyl, etc.; alkoxy, such as methoxy, ethoxy, allyloxy, etc.; aryloxy, such as phenoxy, tolyloxy, xenyloxy, etc.; and dialkylamino, such as dimethylamino, diethylamino, etc. groups.

Chlorophenyl and substituted chlorophenyl magnesium chlorides react with alpha haloesters according to reactions 2 through 7, wherein X is halogen, R' and R" are hydrogen or monovalent organic radicals free of groups reactive to RMgCl, R''' is an organic group or a metal and R is defined in this case as:

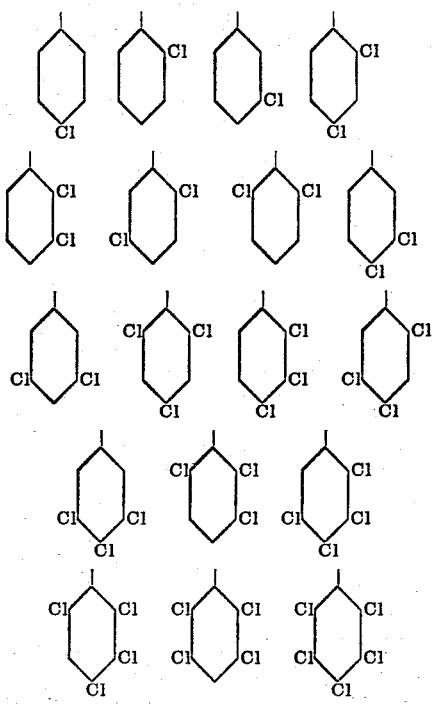

In the above radicals any positions not containing chlorine may be filled with fluorine or any organic monovalent organic group such as alkyl, alkenyl, aryl, dialkylamino, alkoxy, aryloxy and alkenyloxy groups. In addition, divalent groups such as alkylidene dioxy groups may join to adjacent open positions. The substituents may contain functional groups if these are not reactive to the aryl magnesium chloride reagent.

Xenylmagnesium chlorides will react with alpha haloesters according to reactions 2 through 7, wherein X is halogen, R', R" are hydrogen or monovalent organic radicals free of groups reactive to RMgCl and R''' is an organic group or a metal.

R may be defined in the above reactions as a xenyl radical, substituted or unsubstituted. The raw materials for preparing the RMgCl by the compound Q process might also contain some chlorinated terphenyls. Thus, R may be:

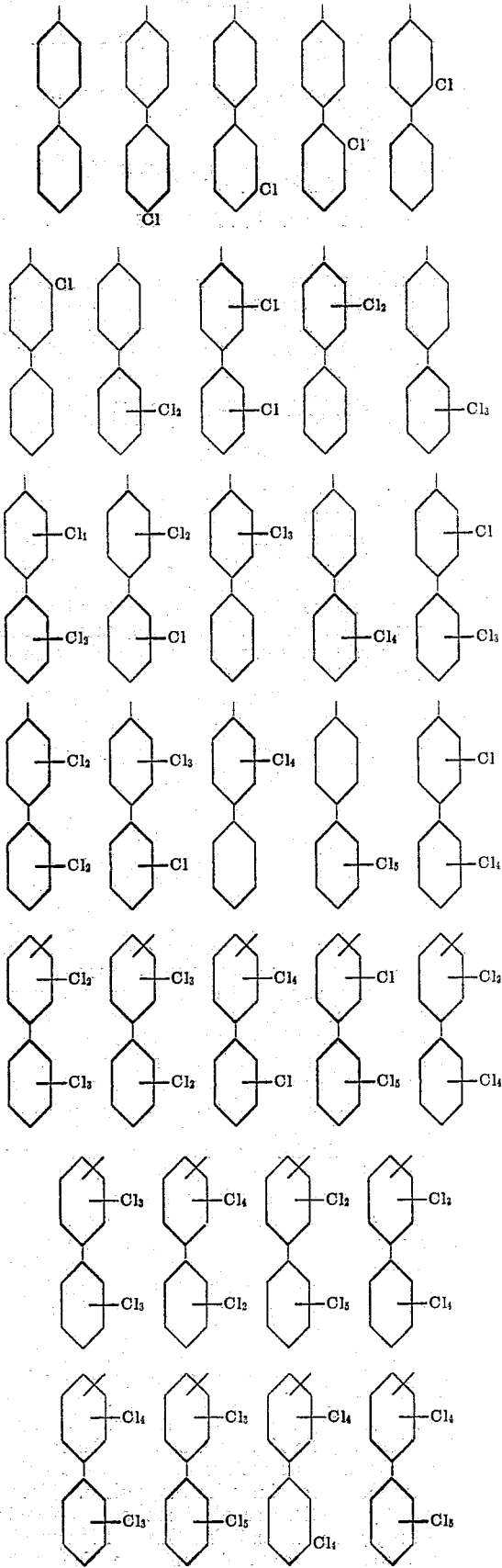

The bond to the magnesium may be ortho, meta or para. Other groups may be present instead of ring hydrogen, including alkyl, alkenyl, aryl, alkaryl, aralkyl, fluorine, alkoxy, alkenoxy, aryloxy, dialkylamino, etc. groups.

Bifunctional arylene di(magnesium chloride) reagents may also be reacted with alpha haloesters according to the following equations:

(8) $R(MgCl)_2 \cdot nQ + XCH_2CO_2R''' \rightarrow$
$R(CH_2CO_2R''')_2 + nQ$ (9) $R(MgCl)_2 \cdot nQ + R'(X)CHCO_2R''' \rightarrow$
$R(R'CHCO_2R''')_2 + nQ$

(10) $R(MgCl)_2 \cdot nQ + R'R''XCCO_2R''' \rightarrow$
$R(R'R''CCO_2R''')_2 + nQ$ In the foregoing bifunctional arylene di(magnesium chloride) reactions, X is halogen, R' and R'' are hydrogen or monovalent radicals as defined above, R' and R'' being inert to $R(MgCl)_2$, R''' is an organic radical or a metal, and $R(MgCl)_2$ may be in general:

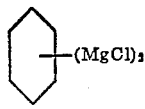

where the hydrogens on the ring may be replaced by any group not reactive to RMgCl, such as chlorine, fluorine, $R''''_2—$, $R''''O—$, $R''''$, etc., and where $R''''$ is a monovalent organic radical. Two neighboring $R''''$ radicals may be cyclized.

$R(MgCl)_2$ may also be:

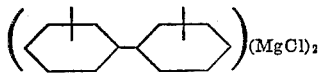

where hydrogen may be replaced as above;

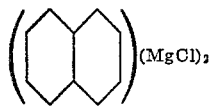

where hydrogen may be replaced as above;

where hydrogen may be replaced as above;

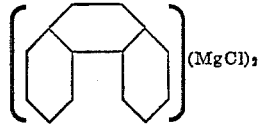

where hydrogen may be replaced as above;

or R may be any other bivalent group where the bonds from carbon to magnesium are those of aromatic carbon to magnesium, where hydrogen may be replaced as described above.

(12) 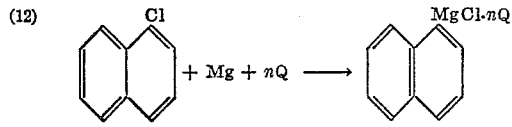

(13) 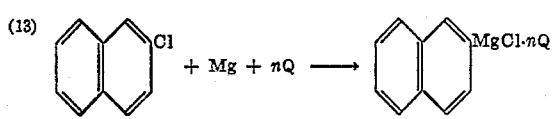

wherein R is naphthyl, substituted or unsubstituted.

Naphthyl magnesium chloride further react with sodium chloroacetate and organic esters of chloroacetic acid to yield useful plant hormones as follows:

(14) 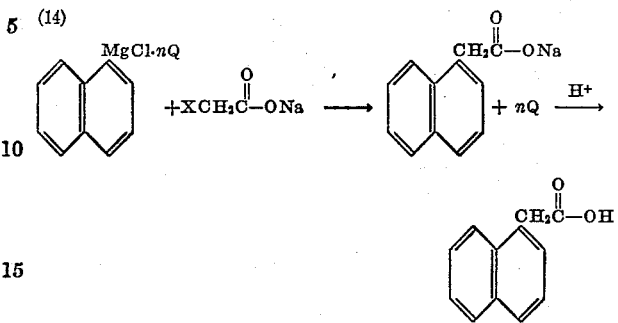

(15) 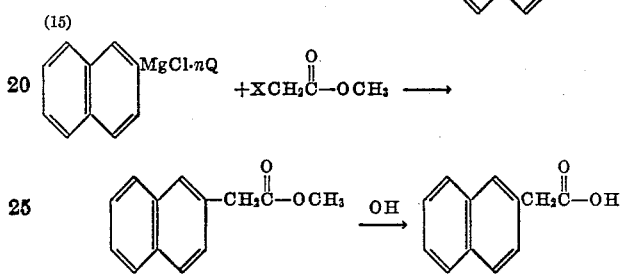

Heterocyclic magnesium chloride reagents, $RMgCl \cdot nQ$, as defined below react with alpha haloacid derivatives according to reactions 2 through 7, wherein X is halogen, R' and R'' are hydrogen or monovalent organic radicals inert to RMgCl, R''' is hydrogen, an organic radical or a metal, n is a small whole number, Q is as previously defined, and R is a radical which includes in its structure an oxygen, sulfur or tertiary nitrogen heterocycle, its bond to magnesium being through a carbon of an aromatic or pseudoaromatic ring.

Among the types of heterocyclic groups, R, which may be employed in reactions such as Nos. 2 through 7 are those shown in the following structural formulas in which a free bond indicates the point of attachment of the —MgCl group except that when two free bonds are shown in one structure they represent alternative points of attachment. In these structures any or all hydrogens in the molecules may be replaced by fluorine, chlorine, alkyl, alkenyl, aryl, alkoxy, aryloxy or other groups not reactive to RMgCl. Two adjacent substituents may be linked or cyclized to form further condensed rings.

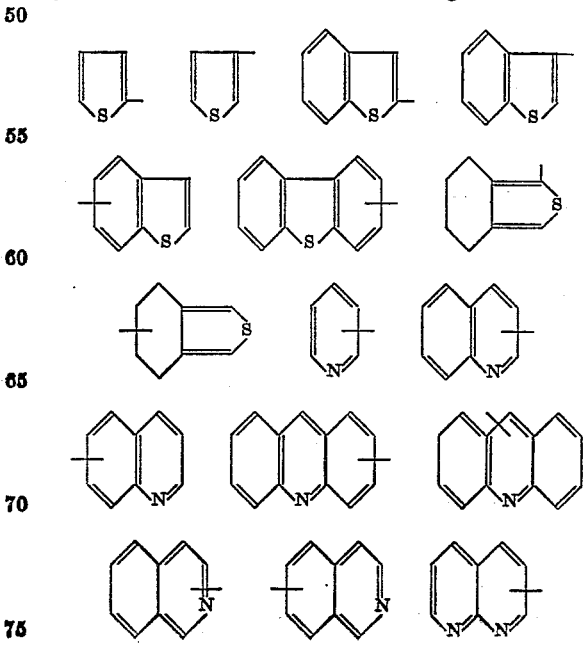

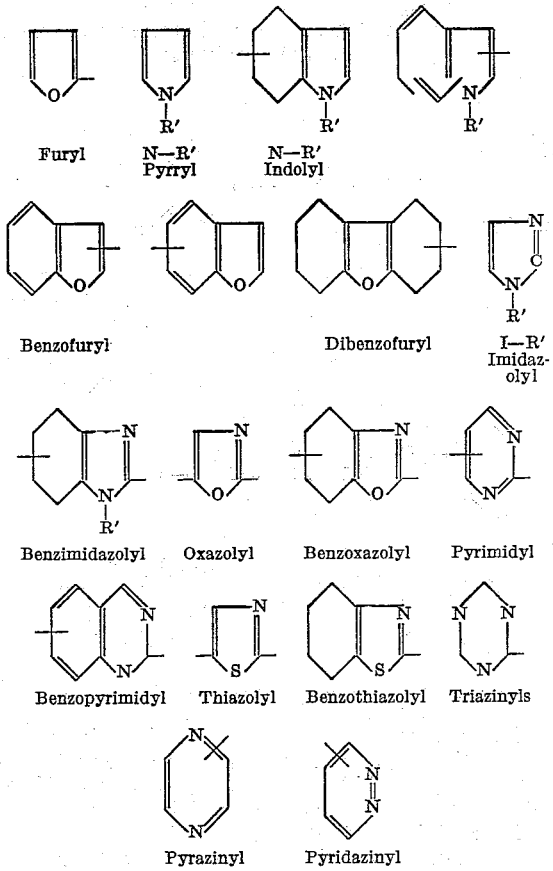

Furyl    N—R' Pyrryl    N—R' Indolyl

Benzofuryl    Dibenzofuryl    I—R' Imidazolyl

Benzimidazolyl    Oxazolyl    Benzoxazolyl    Pyrimidyl

Benzopyrimidyl    Thiazolyl    Benzothiazolyl    Triazinyls

Pyrazinyl    Pyridazinyl

Bifunctional heterocyclic di(magnesium chlorides), $R(MgCl)_2 \cdot nQ$ in which R is a divalent radical which includes in its structure an oxygen, sulfur or tertiary nitrogen heterocycle, its bonds to magnesium being through carbon atom of aromatic or pseudoaromatic rings, react with alpha halo acid derivatives in accordance with reactions 8, 9 and 10; the definitions of X, R', R'', R''' are the same as given for those reactions.

VINYL MAGNESIUM CHLORIDE REAGENTS

In this application, the term "vinyl" radical refers to the vinyl group or to substituted vinyl groups. Thus, a vinyl chloride has the general formula:

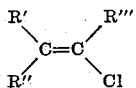

where R', R'' and R''' may be the same or different and may be hydrogen or any hydrocarbon group, aliphatic or aromatic; they may also be hydrocarbon groups with functional group substituents provided that the latter are inert to magnesium and to vinyl magnesium chloride; R' may be cyclized with R'' or R''' as, for example, in the compound

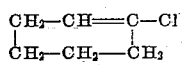

furthermore, R''' may also be chlorine, in which case the magnesium may react with one or both chlorines.

When the formula $RMgCl \cdot nQ$ is used in this application to refer to a vinyl magnesium chloride, then R represents the group

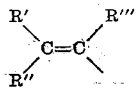

where R', R'' and R''' are as defined above.

Similarly, in a vinyl dimagnesium chloride reagent, $R(MgCl) \cdot nQ$, R represents the bivalent group

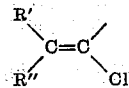

Vinyl magnesuim chloride reagents, $RMgCl \cdot nQ$, as defined above, react with alpha halo acid derivatives according to reactions 2 through 7 where R', R'', R''', n, Q and X are as defined originally for these reactions. The reactions may be illustrated more specifically by the following reactions employing the vinyl magnesium chloride.

(16) 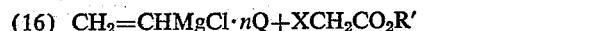

(17) 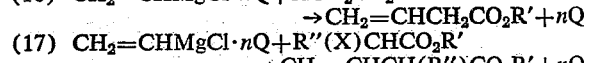

Furthermore, the vinyl dimagnesium chloride reagent $R(MgCl)_2 \cdot nQ$ as previously defined reacts in accordance with reactions 8, 9 and 10, X, R', R'' and R''' being as defined for those reactions.

The following examples are further illustrative of the present invention. It is to be understood, however, that this invention is not restricted thereto.

*Example 1*

Vinylmagnesium chloride complex (one mole) in tetrahydrofuran is added slowly with stirring to a refluxing solution of one mole of ethyl bromoacetate in tetrahydrofuran. After the addition is completed, reflux is continued for 2 or 3 hours. The mixture is then cooled and 200 ml. of cold water, with 5–10 ml. of concentrated hydrochloric acid in it, is added with external cooling (the mixture is stirred vigorously). The layers are separated, the aqueous layer being extracted twice with 50 ml. portions of benzene, the extracts combined with the organic layer, and the organic layer is then stripped of solvent and the ethyl 3-butenoate separated from the ethyl bromoacetate by fractional distillation. There will also be present some products from the reaction of the vinylmagnesium chloride with the ester group, but these do not interfere with the separation.

*Example 2*

By the process of example 1, vinylmagnesium chloride and ethyl α-chlorodiethylacetate yield ethyl α-vinyl α,α-diethylacetate. Vacuum fractionation was substituted for fractional distillation in the separation step.

*Example 3*

Ethyl α chloro-α-phenylacetate and vinylmagnesium chloride by the process of Example 2 yield ethyl α vinyl-α-phenyl acetate.

*Example 4*

Phenylmagnesium chloride by the process of Example 2 yields with ethyl bromoacetate ethyl phenylacetate.

*Example 5*

Phenylmagnesium chloride and ethyl chloroacetate yield ethyl phenylacetate by the process of Example 2.

*Example 6*

One mole of phenylmagnesium chloride-tetrahydrofuran complex in excess tetrahydrofuran is added slowly to a refluxing suspension of one mole of sodium chloroacetate in tetrahydrofuran. After addition is complete the mixture is refluxed for 3 hours, cooled, and added to a cooled mixture of 250 ml. of cold water and 1.1 moles of concentrated hydrochloric acid. The layers are separated and the organic layer is stripped of solvent (by distillation) to leave a residue of phenylacetic acid. It may be further purified by recrystallization from a suitable solvent such as water, alcohol-water, etc.

Example 7

Phenylmagnesium chloride and ethyl α bromopropionate by the process of Example 2, substituting methyltetrahydrofuran for tetrahydrofuran, yield ethyl α methyl-phenylacetate.

Example 8

By the process of Example 6, substituting tetrahydropyran for tetrahydrofuran, phenylmagnesium chloride and sodium α-bromostearate yield α phenylstearic acid.

Example 9

By the process of Example 6, 2 moles of phenylmagnesium chloride and one mole of sodium dichloroacetate yield diphenylacetic acid.

Example 10

By the process of Example 6, p-chlorophenylmagnesium chloride yields p-chlorophenylacetic acid.

Example 11

By the process of Example 9, p-chlorophenylmagnesium chloride yields di(p-chlorophenyl) acetic acid.

Example 12

By the process of Example 2, o-tolylmagnesium chloride and ethyl chloroacetate yield ethyl o-tolylacetate.

Example 13

Ethyl α chlorophenylacetate and m-tolylmagnesium chloride by the process of Example 2 yield ethyl α-m-tolyl-α-phenylacetate.

Example 14 p-Tolylmagnesium chloride used in the process of Example 9 yields di-p-tolylacetic acid.

Example 15

Ethyl chloroacetate and p-anisylmagnesium chloride yield by the process of Example 2 ethyl p-anisylacetate.

Example 16

Sodium α bromostearate and p-phenetylmagnesium chloride by the process of Example 6 yield α-p-phenetylstearic acid.

Example 17

Dichlorophenylmagnesium chloride (from 1,2,4 trichlorobenzene) and ethyl chloroacetate by the process of Example 2 yield ethyl-α-dichlorophenylacetate.

Example 18

Trichlorophenylmagnesium chloride (from 1,2,4,5 tetrachlorobenzene) and ethyl α-bromopropionate by the process of Example 2 yield ethyl α-trichlorophenylacetate.

Example 19

Tetrachlorophenylmagnesium chloride (from pentachlorobenzene) and sodium α bromostearate by the process of Example 6 yield α tetrachlorophenylstearic acid.

Example 20

Pentachlorophenylmagnesium chloride and ethyl α chloro-α-phenylacetate by the process of Example 2 yield ethyl α pentachlorophenyl α-phenylacetate. Molecular distillation is necessary in place of vacuum fractionation.

Example 21

Ethyl chloroacetate and 2-m-xylylmagnesium chloride (from 2 chloro-m-xylene) by the process of Example 2 yield ethyl 2-m-xylylacetate.

Example 22

Biphenylylmagnesium chloride and ethyl chloroacetate by the process of Example 2 yield ethyl biphenylylacetate.

Example 23

Trichlorobiphenylylmagnesium chloride and ethyl chloroacetate by the process of Example 2 yield ethyl trichlorobiphenylylacetate. Molecular distillation is beneficial for purification.

Example 24

Nonachlorobiphenylylmagnesium chloride and sodium α bromostearate by the process of Example 6 yields α nonachlorobiphenylylstearic acid.

Example 25 o-Trifluoromethylphenylmagnesium chloride and ethyl α 2 chloro α-phenylacetate by the process of Example 23 yield ethyl α-o-trifluoromethylphenyl-α-phenylacetate.

Example 26

Ethyl chloroacetate and p-dimethylaminophenylmagnesium chloride by the process of Example 2 yield ethyl p-dimethylaminophenylacetate.

Example 27

Use of ethyl α chloro-α-phenylacetate in Example 26 yields ethyl α phenyl-α-p-dimethylaminophenylacetate.

Example 28

Use of p-diethylaminophenylmagnesium chloride in Example 26 yields ethyl p-diethylaminophenylacetate.

Example 29

Use of p-diethylaminophenylmagnesium chloride and sodium α bromostearate in the process of Example 6 yield α-p-diethylaminophenylstearic acid.

Example 30

Chlorotolylmagnesium chloride (from 2,4 dichlorotoluene) and sodium chloroacetate in the process of Example 6 yield chlorotolylacetic acid.

Example 31

Chloroanisylmagnesium chloride and ethyl α chloro-α phenylacetate by the process of Example 2 yield ethyl α chloroanisyl α-phenylacetate.

Example 32

Chlorophenetylmagnesium chloride and sodium dichloroacetate by the process of Example 9 yield bis chlorophenetylacetic acid.

Example 33

Ethyltetrachlorophenylmagnesium chloride and sodium chloroacetate by the process of Example 6 yield ethyltetrachlorophenylacetic acid.

Example 34

Thienylmagnesium chloride and ethyl chloroacetate yield by the process of Example 2, ethyl α thienylacetate.

Example 35

By the process of Example 6, α thienylmagnesium chloride yields α thienylacetic acid.

Example 36

By the process of Example 2, α thienylmagnesium chloride yields ethyl α-thienyl α, α diethylacetate.

Example 37

By the process of Example 8, α thienylmagnesium chloride yields α-α thienylstearic acid.

Example 38

Sodium α bromodiphenylacetate and α thienylmagnesium chloride yield α-α thienyldiphenylacetic acid by the process of Example 6.

Example 39

Ethyl chloroacetate and α-pyridylmagnesium chloride by the process of Example 2 yield α-pyridylacetate.

Example 40

Ethyl chloroacetate and α-furylmagnesium chloride by the process of Example 2 yield ethyl α-furylacetate.

Example 41

Ethyl chloroacetate and 5-chlorothienylmagnesium chloride (from 2,5-dichlorothiophene) yield, by the process of Example 2, ethyl 5-chlorothienylacetate.

Example 42

One mole of m-fluorophenylmagnesium chloride in excess tetrahydrofuran is allowed to react with 0.5 mole of dry fused zinc chloride for 2 hours. This mix is then added to one mole of ethyl chloroacetate and worked up as in Example 2 to yield ethyl m-fluorophenylacetate.

Example 43

Sodium chloroacetate and 2-benzothiazolylmagnesium chloride by the process of Example 6 yield 2-benzothiazolylacetic acid.

Example 44

Use of 2-benzoxazolylmagnesium chloride in Example 43 yields 2-benzoxazolylacetic acid.

Example 45

Ethyl chloroacetate and 2 methyl-5-benzothiazolylmagnesium chloride in the process of Example 2, yield ethyl α-(2-methyl-5-benzothiazolyl) acetate.

Example 46

By the process of Example 6, 2-quinolylmagnesium chloride yields 2-quinolylacetic acid.

Example 47

By the process of Example 8, 6-quinolylmagnesium chloride yields α-6-quinolylstearic acid.

Example 48

By the process of Example 23, 8-quinolinylmagnesium chloride and ethyl-α-chloro-α-phenylacetate yield ethyl-α-8-quinolyinyl-α-phenylacetate.

Example 49

By the process of Example 2, 1-cyclohexen-1-ylmagnesium chloride and ethyl chloroacetate yield ethyl-α-1-cyclohexen-1-ylacetate.

Example 50

Use of 4-methyl-1-penten-2-ylmagnesium chloride in Example 49 yields ethyl-α-(4-methyl-1-penten-2-yl) acetate.

Example 51

By the process of Example 2, 4-methyl-1-penten-2-ylmagnesium chloride and ethyl-α-bromopropionate yield ethyl-α-(4-methyl-1-penten-2-yl)propionate.

Example 52

By the process of Example 6, 4-methyl-1-penten-2-ylmagnesium chloride and sodium α-bromostearate yield α-(4-methyl-1-penten-2-yl) stearic acid.

Example 53

By the process of Example 2, 2-propen-2-ylmagnesium chloride and ethyl chloroacetate yield ethyl 2-propen-2-ylacetate (3-methyl-3-butenoate).

Example 54

By the process of Example 2, 2-propen-2-ylmagnesium chloride and ethyl chloroacetate yield ethyl 2-propen-2-ylacetate (3-methyl-3-butenoate).

Example 55

By the process of Example 2, 1-propen-1-ylmagnesium chloride and ethyl α-chloro-α-phenylacetate yield ethyl 2-phenyl-3-pentenoate.

Example 56

Use of 2-buten-2-ylmagnesium chloride in Example 55 yields ethyl 3-methyl-3-pentenoate.

Example 57

Ethyl 3-hexenoate results from the use of 1-buten-1-ylmagnesium chloride in Example 56.

Example 58

By the process of Example 7, 1-buten-1-ylmagnesium chloride yields ethyl 2-methyl-3-hexenoate.

Example 59

By the process of Example 2, N-methyl-2-pyrrylmagnesium chloride and ethyl chloracetate yield ethyl N-methyl-2-pyrrylacetate.

Example 60

By the process of Example 2, p-vinylphenylmagnesium chloride and ethyl chloracetate yield ethyl p-vinylphenylacetate.

Example 61

By the process of Example 2, p-vinylphenylmagnesium chloride and ethyl α-bromopropionate yield ethyl α-p-vinylphenylpropionate.

Example 62

By the process of Example 3, p-vinylphenylmagnesium chloride yields ethyl α-phenyl-α-p-vinylphenylacetate.

Throughout the application it is specified that the reactive compound is RMgCl·nQ. This is so in the equations illustrative of the process and of the materials used in the examples. It is necessary that the RMgCl compound be formed in the presence of compound Q. However, the process of the present invention is not dependent upon RMgCl being present in the form of the Q complex (RMgCl·nQ). The illustrative equations herein may also be written with RMgCl in place of RMgCl·nQ and could be read with RMgCl as an alternative reactant to RMgCl·nQ.

The products of the present invention, for example, the acids and esters, are useful as perfume ingredients, as plasticizers or, in the case of the acids, as plasticizer intermediates, and as specialized solvents. Those containing the vinyl group are useful as comonomers for copolymerization with monomers such as styrene, vinyl chloride, butadiene, etc., to form interesting specialty resins and elastomers. Those compounds containing the dialkylamino groups maybe quaternized to form interesting cationoid detergents and germicides as may also those with tertiary nitrogen, such as the pyridyl, quinolyl, benzothiazolyl, benzoxalyl, etc. derivatives.

Several of the compounds have use as fireproofing plasticizers, particularly the esters containing highly chlorinated phenyl and biphenylyl groups. Some have strong antibacterial activity.

Phenylacetic acid and esters are useful in culture media of penicillium notatum as precursors for penicillin productions. The substituted phenylacetic compounds have similar uses.

Many of the esters and acids in particular, α or β naphthylacetic have strong growth regulator powers for agricultural hormone use and also for weed killing use.

While the invention has been described with particular reference to specific embodiments, it is to be understood that it is not limited thereto but is to be construed broadly and restricted solely by the scope of the appended claims.

What is claimed is:

1. A process for preparing an α-substituted acetic acid which comprises reacting a compound selected from the class consisting of ethyl bromoacetate, ethyl-α-chlorodiethylacetate, ethyl-α-chloro-α-phenylacetate, ethyl chloroacetate, ethyl-α-bromoproprionate, sodium chloroacetate, sodium-α-bromostearate, sodium dichloroacetate and sodium-α-bromodiphenylacetate, with an organomagnesium chloride in the presence of compound Q; said organomagnesium chloride being prepared by reacting an organic chloride of the formula RCl, wherein R is selected from the class consisting of aryl, vinyl and aromaticheterocyclic radicals with magnesium in compound Q; wherein said compound Q is selected from the class consisting of tetrahydrofuran, tetrahydropyran, 2-ethoxy tetrahydropyran, dihydropyran, tetrahydrofurfuryl ethyl ether and 2-methyl tetrahydrofuran; and wherein said aromatic-heterocyclic radical is selected from the class consisting of N-methyl-2-pyrryl, 2-quinolyl, 6-quinolyl, 8-quinolyl, 2-methyl-5-benzothiazolyl, 2-benzoxazolyl, 2-benzothiazolyl, 5 chlorothienyl, α-furyl, α-pyridyl and thienyl.

2. The process according to claim 1 in which R is the vinyl radical.

3. The process according to claim 1 in which R is the pyridyl radical.

4. The process according to claim 1 in which R is an aryl radical.

5. The process according to claim 1 in which Q is tetrahydrofuran.

6. The process according to claim 4 in which the aryl radical is the phenyl radical.

References Cited in the file of this patent

Helv. Chim. Acta, vol. 26, 1943, pp. 2251–52.

Kharasch: Grignard Reactions of Non-Metallic Substances, 1952, pp. 731, 873, 595, 950.

Fieser et al.: Org. Chem., Reinhold Publ., 1950, p. 135.